(12) United States Patent
Kato

(10) Patent No.: US 11,233,295 B2
(45) Date of Patent: Jan. 25, 2022

(54) ASSEMBLED BATTERY AND MANUFACTURING METHOD OF ASSEMBLED BATTERY

(71) Applicant: TOYOTA JIDOSHA KABUSHIKI KAISHA, Toyota (JP)

(72) Inventor: Masashi Kato, Konan (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/244,204

(22) Filed: Apr. 29, 2021

(65) Prior Publication Data

US 2021/0249737 A1    Aug. 12, 2021

Related U.S. Application Data

(62) Division of application No. 16/353,501, filed on Mar. 14, 2019.

(30) Foreign Application Priority Data

Mar. 26, 2018   (JP) .............................. JP2018-058566

(51) Int. Cl.
*H01M 2/20*      (2006.01)
*H01M 50/502*    (2021.01)
*H01M 50/20*     (2021.01)
*H01M 50/543*    (2021.01)

(52) U.S. Cl.
CPC ......... *H01M 50/502* (2021.01); *H01M 50/20* (2021.01); *H01M 50/543* (2021.01); *H01M 2220/20* (2013.01)

(58) Field of Classification Search
CPC ... H01M 50/502; H01M 50/20; H01M 50/543
See application file for complete search history.

(56) References Cited

U.S. PATENT DOCUMENTS

| | | |
|---|---|---|
| 6,660,430 B1 | 12/2003 | Yoshida et al. |
| 2009/0035607 A1 | 2/2009 | Nedelec |
| 2010/0266889 A1 | 10/2010 | Kim |
| 2015/0263326 A1 | 9/2015 | Gunther et al. |
| 2018/0090798 A1 | 3/2018 | Valencia, Jr. et al. |

FOREIGN PATENT DOCUMENTS

| | | |
|---|---|---|
| CN | 104916804 A | 9/2015 |
| JP | 6-215757 A | 8/1994 |
| JP | 2016-91607 A | 5/2016 |

*Primary Examiner* — Amanda C. Walke
(74) *Attorney, Agent, or Firm* — Sughrue Mion, PLLC

(57) ABSTRACT

In an assembled battery 1 disclosed herein, each of adjacent single cells 10 is electrically connected by a busbar 30. The busbar 30 of the assembled battery 1 includes a plate-shaped base portion 32 which extends along an arrangement direction X, and a joining projection 36 extending along electrode terminals 12 and 14 and a locking biasing portion 38 which locks the electrode terminals 12 and 14 and the busbar 30 to each other and which biases the electrode terminals 12 and 14 toward the joining projection 36 are formed at both ends of the base portion 32. Furthermore, in the assembled battery 1 disclosed herein, the electrode terminals 12 and 14 and the joining projection 36 come into surface contact with each other and tip portions 12a and 14a of the electrode terminals 12 and 14 and a tip portion 36a of the joining projection 36 are welded to each other. Accordingly, welding between the electrode terminals 12 and 14 and the busbar 30 can be performed in an appropriate manner.

2 Claims, 9 Drawing Sheets

ASSEMBLED BATTERY AND MANUFACTURING METHOD OF ASSEMBLED BATTERY

CROSS REFERENCE TO RELATED APPLICATIONS

The present application is a divisional of U.S. application Ser. No. 16/353,501 filed Mar. 14, 2019 (allowed), which claims priority on the basis of Japanese Patent Application No. 2018-58566 filed in Japan on Mar. 26, 2018, the entire contents of which are incorporated herein by reference.

BACKGROUND

1. Technical Field

The present disclosure to an assembled battery in which a plurality of single cells are electrically connected and to a method of manufacturing the assembled battery.

2. Description of the Related Art

Assembled batteries using a secondary battery such as a lithium-ion secondary battery or a nickel-hydrogen battery or a storage element such as a capacitor as a single cell and including a plurality of the single cells are growing in importance as vehicle-mounted power supplies and as power supplies for personal computers, mobile phones, and the like. In particular, assembled batteries using a lithium-ion secondary battery which is lightweight and which is capable of producing high energy density as a single cell are preferably used as a high-output power supply to be mounted to a vehicle and the like.

A single cell constituting such an assembled battery includes an outer package which houses an electrode body and electrode terminals of positive and negative electrodes. For example, an elongated plate-shaped conductive member or the like is used as the electrode terminal. A first end of the electrode terminal is connected to the electrode body inside the outer package and a second end thereof is exposed to the outside of the outer package. The assembled battery is constructed by arranging a plurality of the single cells structured as described above along a prescribed arrangement direction and electrically connecting the electrode terminals of the respective single cells by an inter-cell connecting member (a busbar).

FIG. 11 is a sectional view illustrating a connection structure of single cells in a conventional assembled battery. In an assembled battery 100 structured as shown in FIG. 11, plate-shaped electrode terminals 112 are bent and brought into surface contact with each other between adjacent single cells 110. In the assembled battery 100, a plate-shaped busbar 130 is disposed so as to cover tip portions of the respective electrode terminals 112. In addition, a contact portion between the busbar 130 and the electrode terminal 112 is irradiated with a laser beam L from outside of the busbar 130 and a welded portion 140 is formed so as to straddle the busbar 130 and the electrode terminal 112. Accordingly, the respective single cells 110 are electrically connected via the busbar 130 and the electrode terminals 112. In the present specification, the "outside of the busbar" is assumed to indicate a side on which single cells are not disposed.

Japanese Patent Application Publication No. 2016-91607 discloses an example of an assembled battery in which each of a plurality of single cells is electrically connected by welding a busbar and electrode terminals to each other.

SUMMARY

However, with the assembled battery 100 structured as described above, there is a risk that the welding of the busbar 130 and the electrode terminals 112 to each other may not be appropriately performed and damage to the single cell 110, a poor weld, or the like may occur.

Specifically, when output of the laser beam L during welding of the busbar 130 and the electrode terminals 112 to each other is excessively large or the busbar 130 is excessively thin, since the laser beam L may penetrate the busbar 130 and the electrode terminals 112 and end up irradiating the single cell 110, there is a risk that the single cell 110 may become damaged by heat of the laser beam L. On the other hand, when output of the laser beam L is excessively small or the busbar 130 is excessively thick, since the laser beam L may not penetrate the busbar 130 and a welded portion 140 which straddles the electrode terminal 112 and the busbar 130 cannot be formed, there is a risk that a connection failure may occur.

In addition, while the electrode terminals 112 are brought into surface contact with each other between adjacent single cells 110 in the assembled battery 100, if a gap has been created between the electrode terminals 112, since the laser beam L passes through the gap and irradiates the single cell 110, there is a risk that the single cell 110 may become damaged by heat of the laser beam L.

The present disclosure has been made in order to solve the problems described above and a primary object thereof is to provide a technique which enables welding of a busbar and an electrode terminal to each other to be appropriately performed and which enables occurrences of damage to a single cell and a poor weld to be preferably prevented.

In order to achieve the object described above, the present disclosure provides an assembled battery configured as described below.

In the assembled battery disclosed herein, a plurality of single cells are arranged along a prescribed arrangement direction and each of adjacent single cells is electrically connected by a busbar. The single cell of the assembled battery includes an electrode body, an outer package which houses the electrode body, and an electrode terminal which is a plate-shaped conductive member having a first end connected to the electrode body inside the outer package and a second end protruding to the outside of the outer package. In addition, the busbar includes a plate-shaped base portion which is disposed between the electrode terminals of adjacent single cells and which extends along the arrangement direction, and a plate-shaped joining projection extending along the plate-shaped electrode terminal and a locking biasing portion which locks the electrode terminal and the busbar to each other and which biases the electrode terminal toward the joining projection are formed at both ends of the plate-shaped base portion in the arrangement direction.

Furthermore, in the assembled battery disclosed herein, the plate-shaped electrode terminal and the plate-shaped joining projection come into surface contact with each other and a tip portion of the electrode terminal and a tip portion of the joining projection are welded to each other.

In order to solve the problems described above, the present inventors conducted various studies on causes of occurrences of damage to a single cell and a poor weld when welding the electrode terminal and the busbar to each other.

As a result of the studies, the fact that a state of welding cannot be checked from the outside of the busbar in conventional assembled batteries was considered to be one of the causes of occurrences of the problems described above. For example, in the assembled battery 100 structure as shown in FIG. 11, in order to weld the busbar 130 and the electrode terminal 112 to each other in an appropriate manner, an irradiation condition of the laser beam L must be adjusted so that the laser beam L penetrates the busbar 130 but does not penetrate the electrode terminal 112. However, in the assembled battery 100, since the busbar 130 is disposed so as to cover the electrode terminal 112, the state of welding cannot be checked from the outside of the busbar 130. As a result, it is difficult to appropriately adjust the irradiation condition of the laser beam L and a likelihood of an occurrence of damage to the single cell 110 due to the laser beam L being excessively strong or a connection failure due to the laser beam L being excessively weak increases.

In addition, the present inventors considered that, with conventional techniques, it is difficult to bring welded objects into contact with each other in an appropriate manner. For example, in the assembled battery 100 shown in FIG. 11, since the electrode terminal 112 and the busbar 130 which are welded objects are not fixed, there is a possibility that a gap is created between the welded objects. Furthermore, with conventional techniques, even when a gap has been created between the welded objects, the creation of the gap cannot be confirmed. Therefore, the possibility that the single cell 110 is damaged by the laser beam L passing through a gap of the electrode terminal 112 increases.

Based on these findings, the present inventors considered that, if a state of welding can be checked when welding an electrode terminal and a busbar to each other and, at the same time, if welded objects can be brought into surface contact with each other in an appropriate manner, the occurrence of various problems that may occur when welding the electrode terminal and the busbar to each other can be prevented. Further studies carried out based on this idea culminated in the conception of a structure of the assembled battery disclosed herein.

In the assembled battery disclosed herein, a plate-shaped joining projection that extends along an electrode terminal is formed at both ends of a base portion of a busbar. In addition, in the assembled battery, the joining projection of the busbar and an electrode terminal of a single cell are brought into surface contact with each other and a tip portion of the electrode terminal and a tip portion of the joining projection are welded to each other. Since welding can be performed while confirming a state of welding by adopting this structure, the welding of the electrode terminal and the busbar to each other can be performed while appropriately adjusting welding conditions.

Furthermore, in the assembled battery disclosed herein, since a locking biasing portion which locks the electrode terminal of the single cell and which biases the electrode terminal toward the joining projection is formed on the busbar, the joining projection and the electrode terminal can be brought into surface contact with each other in an appropriate manner. Accordingly, since a gap can be appropriately prevented from being created between members that are welded objects, a situation where a laser beam passes through the gap and damages the single cell can be avoided.

Therefore, according to the assembled battery disclosed herein, the welding of the busbar and the electrode terminal to each other can be appropriately performed and occurrences of damage to the single cell and a poor weld can be preferably prevented.

In addition, in a preferable aspect of the assembled battery disclosed herein, a locking biasing portion is provided at each of both side edges of both ends of a plate-shaped base portion.

Although one locking biasing portion described above need be formed at each of both ends of the base portion, in consideration of bringing the joining projection of the busbar and the electrode terminal of the single cell into surface contact with each other in a more appropriate manner, the locking biasing portion is more favorably formed in plurality at each of both ends of the base portion. For example, since a total of four locking biasing portions can be provided by forming the locking biasing portion at each of both side edges of both ends of the base portion as in the aspect described above, welding of the busbar and the electrode terminal to each other can be performed more preferably and occurrences of damage to the single cell and a poor weld can be more reliably prevented.

In addition, in a preferable aspect of the assembled battery disclosed herein, the locking biasing portion includes a rising portion which extends along the electrode terminal from both ends of the base portion and an arm portion which covers a tip portion of the electrode terminal and which extends in a curved manner from a tip portion of the rising portion so as to oppose the rising portion.

When the locking biasing portion including the arm portion which covers the tip portion of the electrode terminal is provided as described above, the tip portion of the electrode terminal and the arm portion can be brought into contact with each other and a height position of the tip portion of the electrode terminal can be aligned with a height position of the tip portion of the joining projection. As a result, the welding of the electrode terminal and the joining projection to each other can be performed more preferably.

In addition, in a preferable aspect of the assembled battery disclosed herein, an outer package of the single cell is a laminated film.

Metallic cases, laminated films made of resin, and the like are used as outer packages for housing an electrode body. Among such outer packages, laminated films have various advantages including low material cost. However, since a laminated film is less rigid than a metallic case, there is a problem in that it is difficult to position single cells when arranging the single cells. In contrast, in the assembled battery disclosed herein, since the busbar and the electrode terminal can be locked to each other and fixed by the locking biasing portion, each of the single cells can be readily positioned.

Furthermore, since a laminated film is less heat-resistant than a metallic case, there is another problem in that, when welding the electrode terminal and the busbar to each other using a laser beam, a single cell may become readily damaged when the outer package is irradiated by the laser beam. However, as described above, in the assembled battery disclosed herein, welding can be performed while checking a state of welding and, at the same time, a gap can be prevented from being created between welded objects. Therefore, a single cell can be appropriately prevented from being irradiated with a laser beam.

In this manner, according to the assembled battery disclosed herein, the occurrence of various problems that may occur when using a laminated film as the outer package can be preferably prevented.

In addition, a manufacturing method of an assembled battery is provided as another aspect of the present disclosure.

The manufacturing method of an assembled battery disclosed herein is a method of manufacturing an assembled battery in which a plurality of single cells are arranged along a prescribed arrangement direction and each of adjacent single cells is electrically connected by a busbar. The single cell of an assembled battery obtained by the manufacturing method described above includes an electrode body, an outer package which houses the electrode body, and an electrode terminal which is a plate-shaped conductive member having a first end connected to the electrode body inside the outer package and a second end protruding to the outside of the outer package. In addition, the busbar includes a plate-shaped base portion which is disposed between the electrode terminals of adjacent single cells and which extends along the arrangement direction, and a plate-shaped joining projection extending along a height direction of the single cell and a locking biasing portion which locks the electrode terminal of the single cell and which biases the electrode terminal toward the joining projection are formed at both ends of the plate-shaped base portion in the arrangement direction.

Furthermore, the manufacturing method of an assembled battery disclosed herein includes the steps of: bringing the plate-shaped electrode terminal and the plate-shaped joining projection into surface contact with each other, causing the locking biasing portion to lock the electrode terminal of the single cell, and causing the locking biasing portion to bias the electrode terminal toward the joining projection; and welding a tip portion of the electrode terminal and a tip portion of the joining projection to each other.

In the manufacturing method disclosed herein, the tip portion of the electrode terminal extending along the height direction and the tip portion of the joining projection of the busbar are welded to each other. Accordingly, since welding can be performed while confirming a state of welding, the welding of the electrode terminal and the busbar to each other can be performed in an appropriate manner.

In addition, using the locking biasing portion, the busbar and the electrode terminal can be fixed to each other and the electrode terminal can be biased toward the joining projection. Therefore, a gap can be prevented from being created between the electrode terminal and the joining projection which are welded objects.

Consequently, according to the manufacturing method disclosed herein, the welding of the busbar and the electrode terminal to each other can be appropriately performed and occurrences of damage to the single cell and a poor weld can be preferably prevented.

In addition, in a preferable aspect of the manufacturing method of an assembled battery disclosed herein, the tip portion of the electrode terminal and the tip portion of the joining projection are welded to each other by a laser beam.

As described earlier, with conventional techniques, various problems including damage to a single cell and a poor weld may occur when performing laser welding. In contrast, with the manufacturing method of an assembled battery disclosed herein, a state of welding of the electrode terminal and the busbar to each other can be checked from the outside and, at the same time, a gap can be prevented from being created between welded objects. Consequently, according to the manufacturing method disclosed herein, occurrences of problems such as damage to a single cell and a poor weld which may occur when performing laser welding can be preferably prevented.

Moreover, in the manufacturing method disclosed herein, means for welding the electrode terminal and the busbar to each other is not limited to laser welding and various welding means such as ultrasonic welding can be adopted. Even when such welding means other than laser welding is used, since welding can be performed while checking welding positions of the electrode terminal and the busbar from the outside and, at the same time, the electrode terminal and the busbar can be brought into surface contact with each other in an appropriate manner, an effect of preferably preventing the occurrences of a poor weld and the like can be achieved.

BRIEF DESCRIPTION

DETAILED DESCRIPTION OF THE PREFERRED EMBODIMENTS

Figure 1:
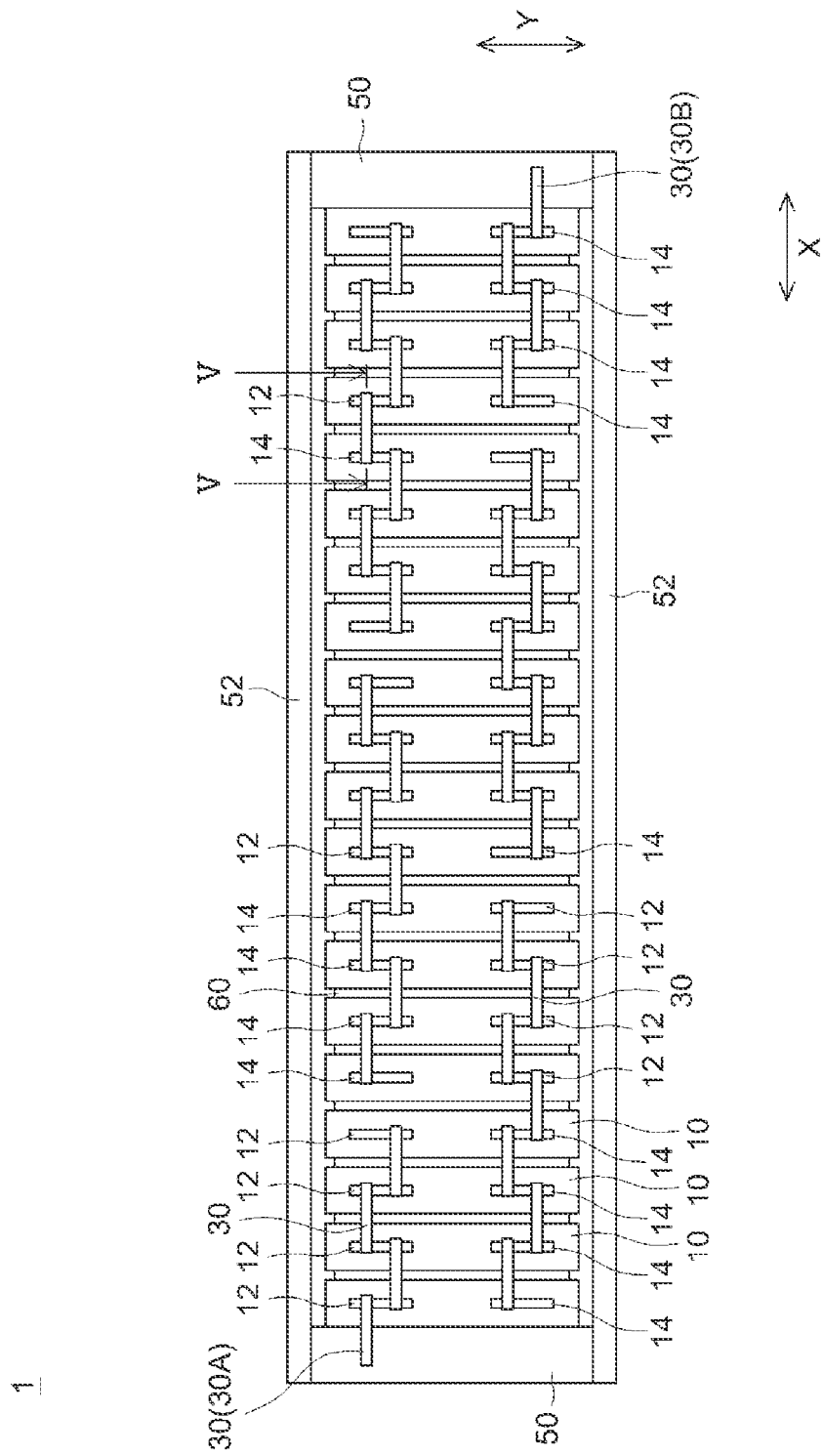
FIG. 1 is a plan view schematically showing an assembled battery according to an embodiment of the present disclosure.

Hereinafter, an assembled battery using a lithium-ion secondary battery as a single cell and including a plurality of the lithium-ion secondary batteries will be described as an example of an assembled battery according to an embodiment of the present disclosure. The single cell used in the assembled battery disclosed herein is not limited to a lithium-ion secondary battery and, for example, a secondary battery such as a nickel-hydrogen battery or a storage element such as a capacitor can also be used.

In the following drawings, members and portions that produce the same effects will be described using the same reference characters. It should be noted that dimensional relationships (length, width, thickness, and the like) shown in the respective drawings do not reflect actual dimensional relationships. In addition, matters required to carry out the present disclosure (for example, a material of an electrode body and a manufacturing method of a single cell) other than those matters specifically described in the present specification can be comprehended as design matters for a person with ordinary skill in the art based on prior art in a relevant technical field.

1. Assembled Battery According to Present Embodiment

FIG. 1 is a plan view schematically showing an assembled battery according to the present embodiment. It should be noted that, in the respective drawings of the present specification, reference character X indicates "an arrangement direction of a single cell", reference character Y indicates "a width direction of a single cell", and reference character Z indicates "a height direction of a single cell".

(1) Overall Structure

As shown in FIG. 1, an assembled battery 1 according to the present embodiment includes a plurality of (in FIG. 1, twenty) single cells 10. Each of the single cells 10 is arranged along the arrangement direction X. A buffer member 60 is sandwiched between the arranged single cells 10. In addition, each of the single cells 10 is electrically connected by a busbar 30. Furthermore, in the assembled battery 1, a constraining plate 50 is disposed on both outer sides in the arrangement direction X and a constraining band 52 is stretched across a pair of the constraining plates 50. Accordingly, the single cells 10 arranged along the arrangement direction X are constrained by the pair of constraining plates 50.

In the present specification, the single cell 10 arranged at a first end (a left side in FIG. 1) in the arrangement direction X will be referred to as a "first single cell". In addition, single cells subsequent to the "first single cell" will be referred to by sequentially increasing arrangement numbers such as "a second single cell, a third single cell, and so on" toward a second end (a right side in FIG. 1).

(2) Single Cell

Figure 2:
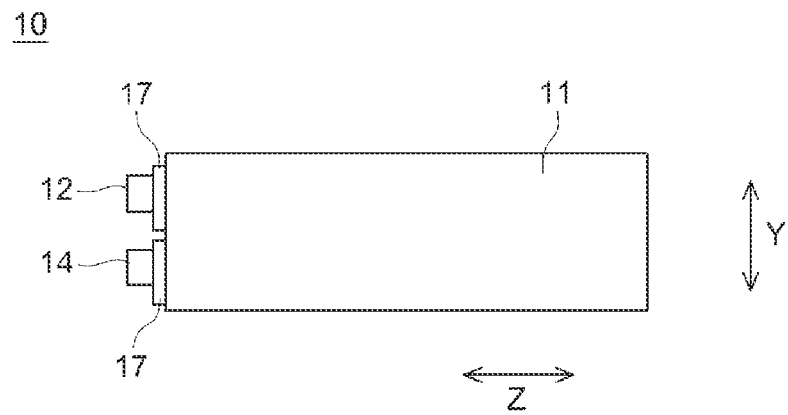
FIG. 2 is a side view schematically showing a cell used in the assembled battery according to the embodiment of the present disclosure.

FIG. 2 is a side view schematically showing a cell used in the assembled battery according to the present embodiment. As shown in FIG. 2, the single cell 10 according to the present embodiment includes an outer package 11. In the present embodiment, a laminated film is used as the outer package 11 and an electrode body and an electrolyte are housed inside the laminated film.

Since electrode bodies and electrolytes similar to those used in conventional general lithium-ion secondary batteries can be used without restrictions as the electrode body and the electrolyte, a detailed description thereof will be omitted.

In addition, the single cell 10 according to the present embodiment includes a pair of electrode terminals 12 and 14 constituted by a positive electrode and a negative electrode. Each of the electrode terminals 12 and 14 is an elongated plate-shaped conductive member and extends along the height direction Z of the single cell 10. Although not illustrated, a first end of the electrode terminals 12 and 14 is electrically connected to the electrode body inside the outer package 11. In addition, a second end of the electrode terminals 12 and 14 is exposed to the outside of the outer package 11 and extends along the height direction Z as shown in FIG. 2.

An electrode terminal indicated by reference character 12 in FIG. 2 is a positive electrode terminal connected to the positive electrode of the electrode body. In addition, an electrode terminal indicated by reference character 14 is a negative electrode terminal connected to the negative electrode of the electrode body. Furthermore, the outer package 11 of the single cell 10 according to the present embodiment is provided with an insulated holder 17 which holds the electrode terminals 12 and 14 exposed to the outside of the outer package 11.

(3) Busbar

As shown in FIG. 1, the assembled battery 1 according to the present embodiment includes a plurality of plate-shaped busbars 30 which extend along the arrangement direction X of the single cells 10. In addition, each of the adjacent single cells 10 is sequentially connected by the busbars 30. Specifically, in the assembled battery 1, positive electrode terminals 12 (and negative electrode terminals 14) of the first to fourth single cells 10 are connected by the busbars 30 (each of the first to fourth single cells 10 is connected in parallel). Furthermore, in the fifth to eighth single cells 10, each single cell 10 is disposed in opposite orientations so that positions of the positive electrode terminals 12 and the negative electrode terminals 14 are reversed relative to the first to fourth single cells 10. Accordingly, the positive electrode terminal 12 of the fourth single cell 10 and the negative electrode terminal 14 of the fifth single cell 10 are connected by the busbar 30 and, at the same time, the fifth to eighth single cells 10 are connected in parallel. In this manner, the assembled battery 1 according to the present embodiment is constructed by forming a plurality of units which connect four single cells 10 in parallel and then connecting the units with each other in series.

A busbar (a total positive busbar) 30A which is only connected to the positive electrode terminal 12 of the first single cell 10 is provided at the first end in the arrangement direction X, and a busbar (a total negative busbar) 30B which is only connected to the negative electrode terminal 14 of the 20th single cell 10 is provided at the second end in the arrangement direction X. The total positive busbar 30A and the total negative busbar 30B are connected to an external device such as a motor of a vehicle.

Figure 3A:
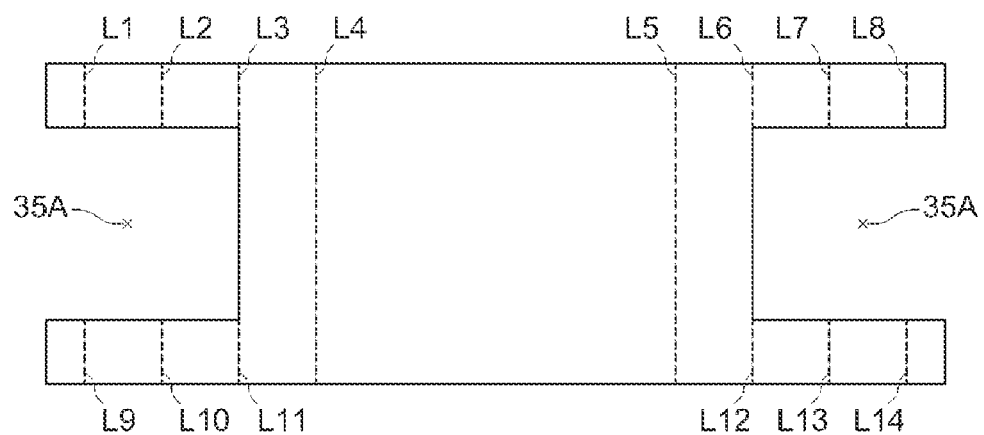
FIG. 3A is a plan view illustrating a procedure of fabricating a busbar used in the assembled battery according to the embodiment of the present disclosure.

Next, a specific structure of the busbar 30 used in the assembled battery 1 according to the present embodiment will be described. The busbar 30 is fabricated by die-cutting a conductive plate (for example, an aluminum plate or a copper plate) having prescribed rigidity and bending the die-cut conductive plate. Specifically, first, a notched portion 35A is formed by die-cutting a center of both ends of a conductive plate 35 such as that shown in FIG. 3A. Subsequently, the conductive plate 35 is bent along dotted line portions L1 to L14 shown in FIG. 3A to fabricate the busbar 30 according to the present embodiment.

Figure 3B:
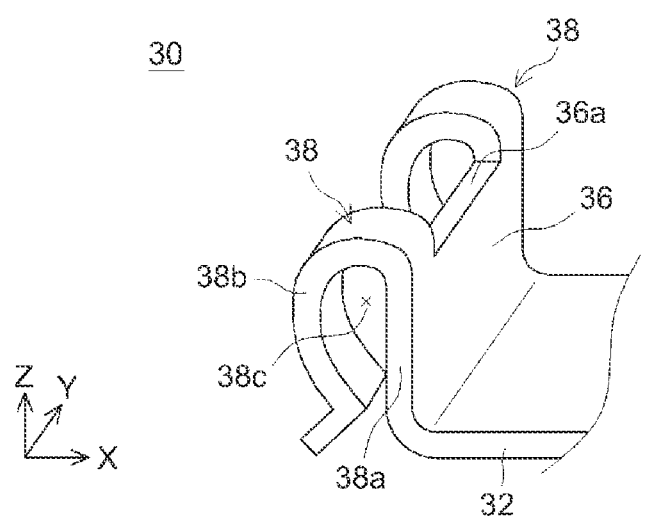
FIG. 3B is a perspective view showing a first end of the busbar used in the assembled battery according to the embodiment of the present disclosure.

As shown in FIG. 3B, the busbar 30 fabricated in this manner includes a base portion 32 which extends along the arrangement direction X of the single cells 10. In addition, a joining projection 36 which extends along the height direction Z is formed at the center of both ends of the base portion 32.

Furthermore, in the busbar 30, a locking biasing portion 38 with an inverted U-shape is formed at each of both side edges of both ends of the base portion 32. The locking biasing portion 38 with an inverted U-shape includes a rising portion 38a which extends along the height direction Z (the direction in which the electrode terminals 12 and 14 extend) and an arm portion 38b which extends in a curved manner from a tip portion of the rising portion 38a so as to oppose the rising portion 38a. In addition, an inserted portion 38c which is enclosed by the rising portion 38a and the arm portion 38*b* is formed in the locking biasing portion 38 of the busbar 30. In the present embodiment, the arm portion 38*b* is bent so that respective positions in the height direction X of an upper portion of the inserted portion 38*c* and a tip portion 36*a* of the joining projection 36 are aligned with each other.

(4) Connection Structure Between Electrode Terminal and Busbar

Figure 4:
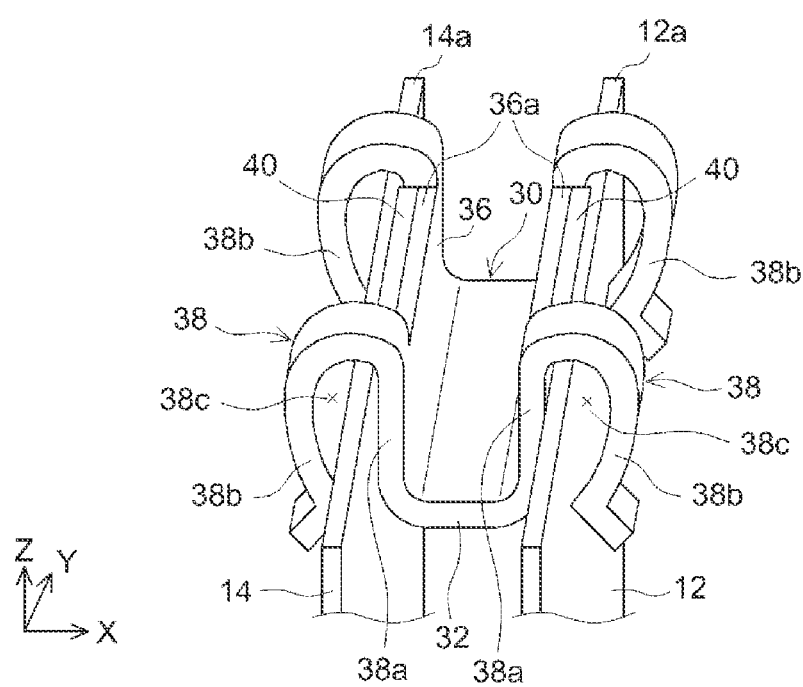
FIG. 4 is a perspective view schematically showing a connection structure between electrode terminals and the busbar of the assembled battery according to the embodiment of the present disclosure.
Figure 5:
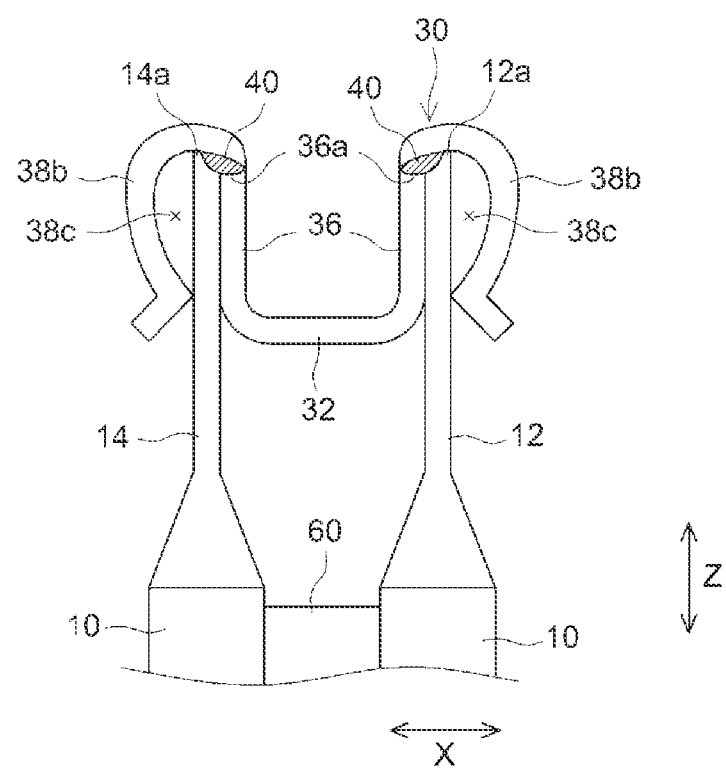
FIG. 5 is a sagittal view along V-V in FIG. 1.

Next, a connection structure between the electrode terminals 12 and 14 and the busbar 30 in the assembled battery 1 according to the present embodiment will be described with reference to FIGS. 4 and 5. FIG. 4 is a perspective view schematically showing electrode terminals and a busbar of the assembled battery according to the present embodiment, and FIG. 5 is a sagittal view along V-V in FIG. 1.

As described above, the busbar 30 according to the present embodiment includes the base portion 32 which extends along the arrangement direction X, the joining projection 36 which extends along the height direction Z from the center of both ends of the base portion 32, and the locking biasing portion 38 with an inverted U-shape which is formed at both side edges of both ends of the base portion 32.

When connecting the electrode terminals 12 and 14 of the single cell 10 using the busbar 30, first, the base portion 32 of the busbar 30 is disposed between the respective electrode terminals 12 and 14 of two adjacent single cells 10 and the electrode terminals 12 and 14 are inserted into the inserted portions 38*c* (refer to FIG. 3) of the locking biasing portions 38 formed at both ends of the busbar 30. Accordingly, the electrode terminals 12 and 14 are locked by the locking biasing portions 38 and the busbar 30 and the electrode terminals 12 and 14 are fixed to each other.

In addition, in the present embodiment, the arm portion 38*b* which is curved so as to oppose the rising portion 38*a* is formed and the electrode terminals 12 and 14 are pressed by the arm portion 38*b*. Accordingly, the electrode terminals 12 and 14 of the single cell 10 are biased toward the joining projection 36. As a result, the electrode terminals 12 and 14 and the joining projection 36 of the busbar 30 can be brought into surface contact with each other in an appropriate manner.

Furthermore, in the present embodiment, the arm portion 38*b* of the locking biasing portion 38 is formed so as to cover tip portions 12*a* and 14*a* of the electrode terminals 12 and 14, and the tip portions 12*a* and 14*a* of the electrode terminals 12 and 14 are brought into contact with an upper portion of the arm portion 38*b* of the locking biasing portion 38. Accordingly, a height position of the tip portion 36*a* of the joining projection 36 of the busbar 30 and height positions of the tip portions 12*a* and 14*a* of the electrode terminals 12 and 14 can be aligned with each other.

Next, in the present embodiment, the tip portion 36*a* of the joining projection 36 and the tip portions 12*a* and 14*a* of the electrode terminals 12 and 14 are respectively irradiated with a laser beam and a welded portion 40 is formed so as to straddle the joining projection 36 and the electrode terminals 12 and 14. Accordingly, the busbar 30 and the electrode terminals 12 and 14 are welded and electrically connected to each other.

As described above, in the assembled battery 1 according to the present embodiment, the joining projection 36 which comes into surface contact with the electrode terminals 12 and 14 is formed on the busbar 30. In addition, the tip portion 36*a* of the joining projection 36 and the tip portions 12*a* and 14*a* of the electrode terminals 12 and 14 are welded to each other. Adopting such a structure enables welding to be performed while checking a state of welding between the electrode terminals 12 and 14 and the busbar 30. Therefore, according to the present embodiment, the welding of the busbar 30 and the electrode terminals 12 and 14 to each other can be appropriately performed and occurrences of damage to the single cell 10, a poor weld, and the like can be preferably prevented.

In addition, in the present embodiment, the electrode terminals 12 and 14 of the single cell 10 and the joining projection 36 of the busbar 30 are locked by the locking biasing portion 38 and, at the same time, the electrode terminals 12 and 14 are biased toward the joining projection 36 by the locking biasing portion 38. Accordingly, a gap can be prevented from being created between the electrode terminals 12 and 14 and the joining projection 36 which are welded objects. As a result, a situation where a laser beam passes through a gap between welded objects and ends up irradiating the single cells 10 can be preferably prevented.

As described above, according to the present embodiment, since the welding of the busbar 30 and the electrode terminals 12 and 14 to each other can be appropriately performed, occurrences of damage to the single cell 10 and a poor weld can be preferably prevented.

Furthermore, in the present embodiment, since the arm portion 38*b* of the locking biasing portion 38 is formed so as to cover tip portions 12*a* and 14*a* of the electrode terminals 12 and 14, the height positions of the tip portions 12*a* and 14*a* of the electrode terminals 12 and 14 and the height position of the tip portion 36*a* of the joining projection 36 can be readily aligned with each other. Accordingly, the welded portion 40 which straddles the tip portions 12*a* and 14*a* of the electrode terminals 12 and 14 and the tip portion 36*a* of the joining projection 36 can be readily formed.

In addition, in the present embodiment, a laminated film is used as the outer package 11 of the single cell 10. While the laminated film has various advantages including low material cost, since the laminated film is less rigid than a metallic battery case, there is a problem in that it is difficult to position each single cell 10. In contrast, in the present embodiment, since the electrode terminals 12 and 14 of each single cell 10 are fixed via the busbar 30 having the locking biasing portion 38, each single cell 10 can be readily positioned.

Furthermore, since the laminated film is less heat-resistant than a metallic case, there is another problem in that the single cell 10 may be readily damageable when the laminated film is irradiated by a laser beam. However, in the present embodiment, as described above, since the electrode terminals 12 and 14 are biased toward the joining projection 36 by the arm portion 38*b* of the locking biasing portion 38, a gap can be prevented from being created between the electrode terminals 12 and 14 and the joining projection 36. Accordingly, a situation where the single cells 10 are irradiated by a laser beam having passed through a gap between members that are welded objects can be appropriately prevented.

As described above, according to the present embodiment, problems that arise from the use of a laminated film as the outer package 11 can be appropriately solved and only advantages such as a low material cost can be enjoyed.

It should be noted that the outer package used in the assembled battery disclosed herein is not limited to a laminated film and a battery case or the like made of a metal such as aluminum may also be used.

In addition, when manufacturing a general assembled battery, a fixing jig for preventing a displacement of an arrangement position of each single cell is used. However, when manufacturing the assembled battery 1 according to the present embodiment, since each single cell 10 can be fixed via the busbar 30 having the locking biasing portion 38, there is no longer a need to use a fixing jig. Therefore, the present embodiment can also contribute toward reducing equipment expenses.

2. Assembled Battery According to Other Embodiments

While the assembled battery 1 according to an embodiment of the present disclosure has been described above, the present disclosure is not limited to the described embodiment and various modifications can be made thereto.

(1) Structure of Busbar

As shown in FIG. 4, the busbar 30 according to the embodiment described above includes four locking biasing portions 38. However, the locking biasing portion of the busbar need only be capable of locking the electrode terminals and the busbar to each other and biasing the electrode terminals toward the joining projection, and the number of locking biasing portions is not limited to that in the embodiment described above.

Figure 6:
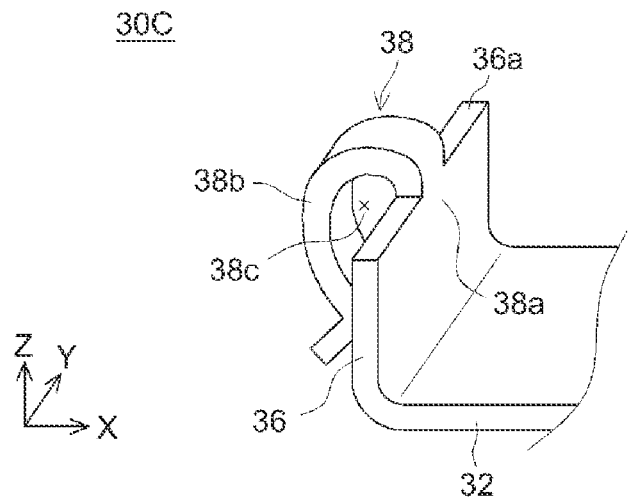
FIG. 6 is a perspective view showing a first end of a busbar used in an assembled battery according to another embodiment of the present disclosure.

For example, in a busbar 30C shown in FIG. 6, one locking biasing portion 38 is formed at the center of each of both ends of the base portion 32 and, at the same time, the joining projection 36 is formed which extends along the height direction Z from both side edges of both ends of the base portion 32. Even when using the busbar 30C having a pair of locking biasing portions 38 formed at both ends, the electrode terminals and the busbar 30C can be locked to each other by the locking biasing portions 38 and, at the same time, the electrode terminals can be biased toward the joining projection 36 by the arm portions 38b of the locking biasing portions 38.

However, forming the locking biasing portion 38 on each of both side edges of both ends of the base portion 32 as in the busbar 30 shown in FIG. 3B is favorable because the busbar 30 and the electrode terminals can be fixed to each other in a more preferable manner.

In addition, a shape of the locking biasing portion 38 is similarly not limited to that in the embodiment described above.

Figure 7:
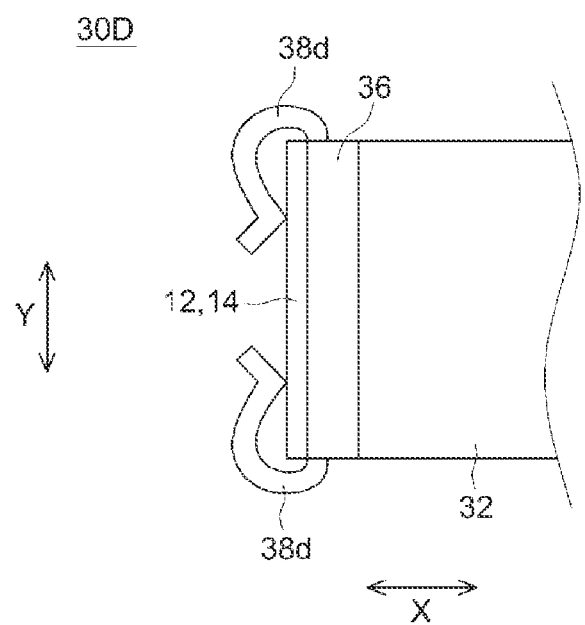
FIG. 7 is a plan view showing a first end of a busbar used in an assembled battery according to another embodiment of the present disclosure.

For example, the locking biasing portion 38 of the busbar 30 according to the embodiment described above includes the arm portion 38b which is curved so as to cover the tip portions 12a and 14a of the electrode terminals 12 and 14 as shown in FIG. 4. However, even when forming the locking biasing portion 38 including an arm portion 38d which is curved so as to cover both side edges of the electrode terminals 12 and 14 as shown in FIG. 7, the electrode terminals 12 and 14 and a busbar 30D can be locked to each other and the electrode terminals 12 and 14 can be biased toward the joining projection 36 by the arm portion 38d.

However, providing the arm portion 38b which is curved so as to cover the tip portions 12a and 14a of the electrode terminals 12 and 14 as described above is favorable because the height positions of the tip portions 12a and 14a of the electrode terminals 12 and 14 and the height position of the tip portion 36a of the joining projection 36 can be aligned with each other and welding of the electrode terminals 12 and 14 to the joining projection 36 can be readily performed.

(2) Arrangement of Respective Single Cells

In addition, an arrangement structure of the respective single cells constituting the assembled battery is similarly not limited to that in the embodiment described above and can be changed as deemed appropriate in accordance with a purpose of the assembled battery and a structure of the single cells.

For example, the assembled battery 1 according to the embodiment described above is constructed by forming a plurality of units which connect four single cells 10 in parallel and then connecting the units with each other in series. In this assembled battery 1, an orientation of the single cells 10 is interchanged for each unit to reverse positions of the positive electrode terminal 12 and the negative electrode terminal 14 so that the respective units are appropriately connected by the busbar 30 having a flat plate shape.

Figure 8:
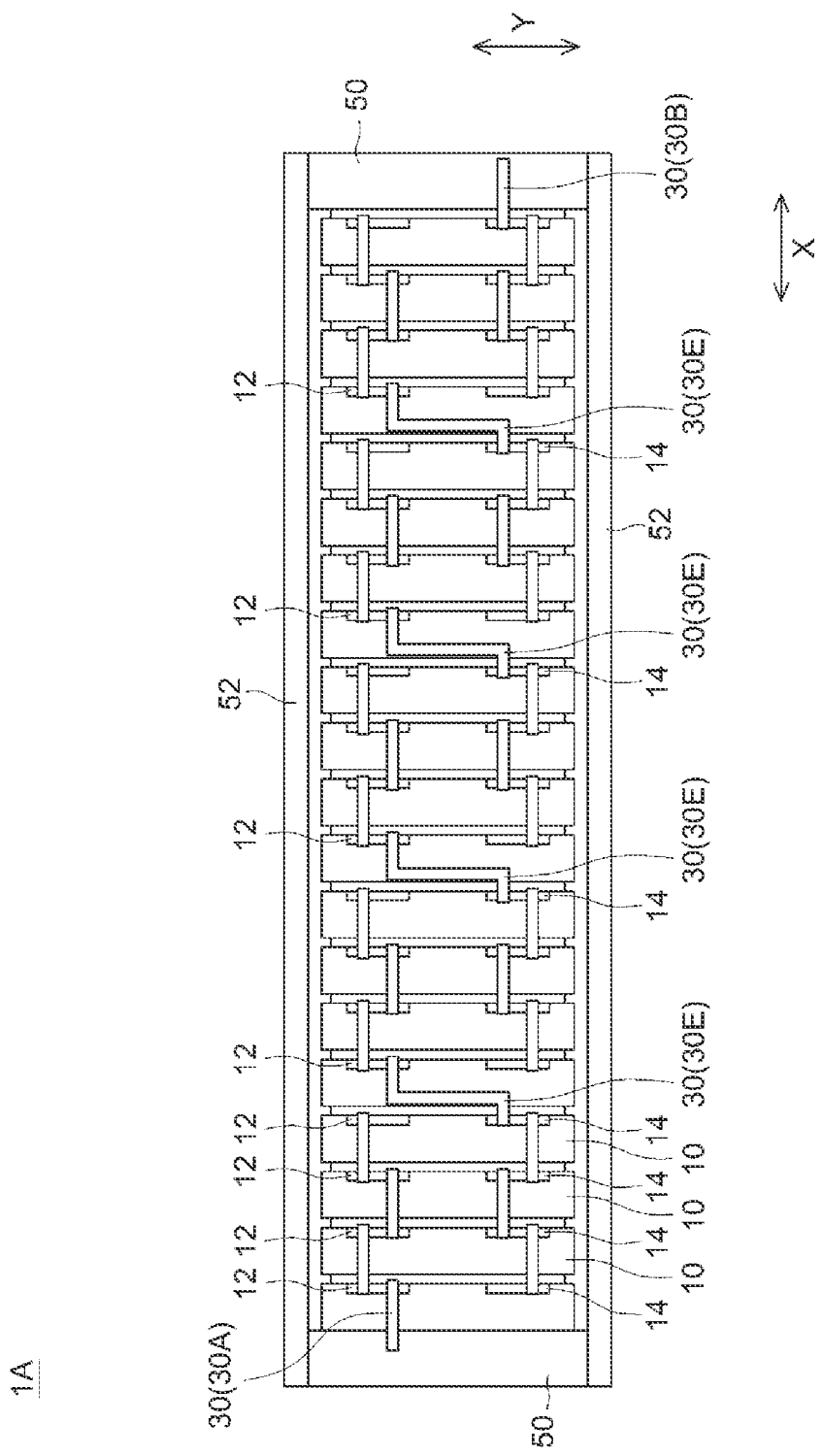
FIG. 8 is a plan view schematically showing an assembled battery according to another embodiment of the present disclosure.

However, the respective single cells 10 constituting the assembled battery 1 may be arranged in a same orientation so that all of the positive electrode terminals 12 and the negative electrode terminals 14 are disposed at same positions as shown in FIG. 8. In the case of an assembled battery 1A structured in this manner, when respectively connecting the fourth and fifth single cells 10, the eighth and ninth single cells 10, the twelfth and thirteenth single cells 10, and the sixteenth and seventeenth single cells 10 with each other, a busbar 30E with a stepped shape in a plan view is favorably used. Accordingly, the positive electrode terminals 12 and the negative electrode terminals 14 can be appropriately connected. In addition, even when using the busbar 30E structured in this manner, forming a joining projection and a locking biasing portion at both ends of the busbar 30E enables the electrode terminals of the single cells and the busbar to be connected in an appropriate manner.

Furthermore, as shown in FIG. 2, both the positive electrode terminal 12 and the negative electrode terminal 14 are provided at a first end of the single cell 10 in the embodiment described above. However, the structure of a single cell is not limited to that in the embodiment described above and various structures can be adopted.

Figure 9:
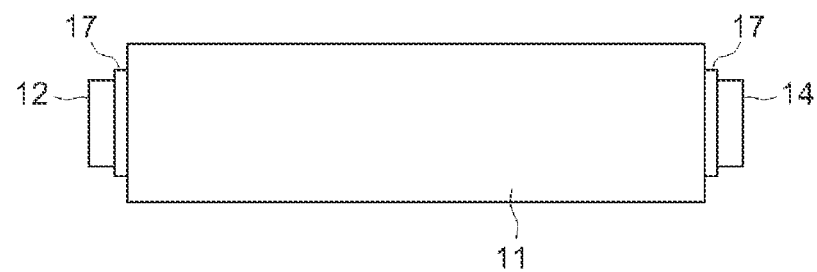
FIG. 9 is a side view schematically showing a cell used in an assembled battery according to another embodiment of the present disclosure.
Figure 10A:
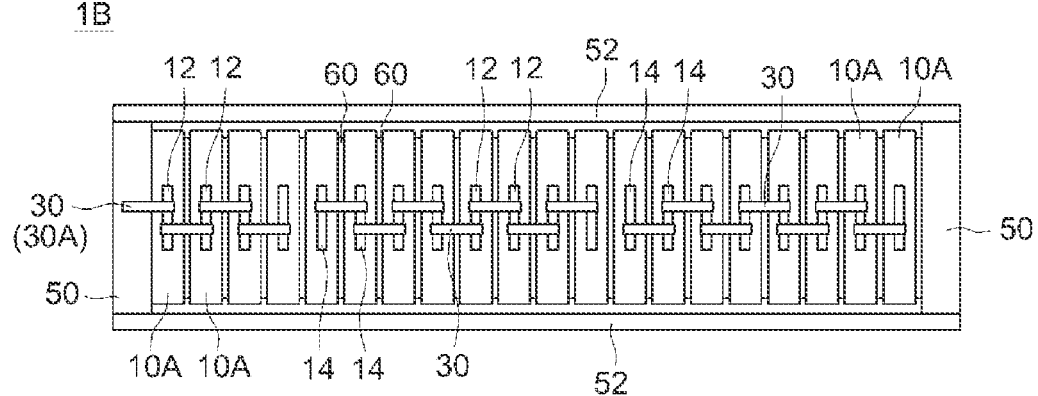
FIG. 10A is a plan view schematically showing an assembled battery constructed using the cell shown in FIG. 9.
Figure 10B:
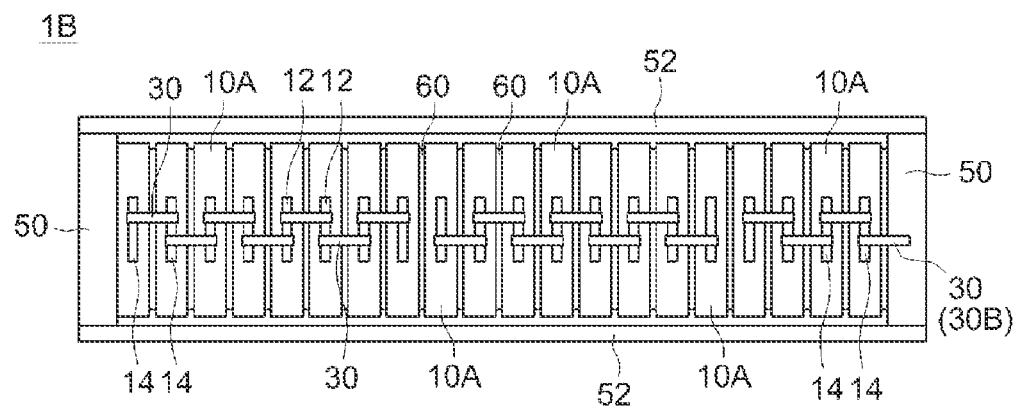
FIG. 10B is a plan view schematically showing an assembled battery constructed using the cell shown in FIG. 9.
Figure 11:
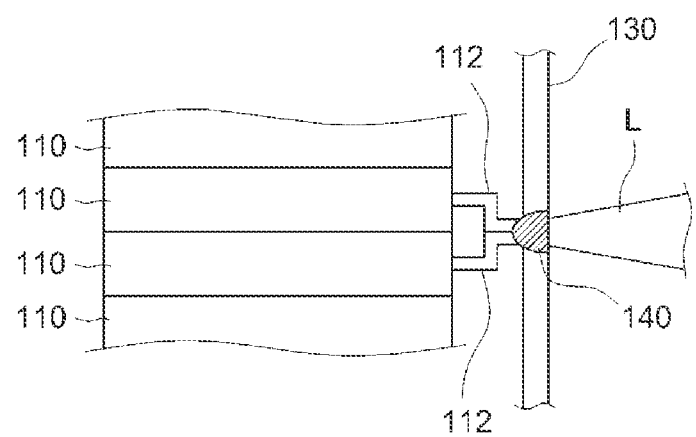
FIG. 11 is a sectional view illustrating a connection structure between single cells in a conventional assembled battery.

For example, as shown in FIG. 9, a single cell 10A in which an end of the positive electrode terminal 12 is exposed from a first end of the outer package 11 and an end of the negative electrode terminal 14 is exposed from a second end of the outer package 11 can also be used. When using the single cell 10A structured as described above, as shown in FIGS. 10A and 10B, a connection structure by the busbar 30 is provided on both surfaces of an assembled battery 1B. Specifically, as shown in FIG. 10A, the total positive busbar 30A to which only the positive electrode terminal 12 of the single cell 10A is connected is provided on a first surface of the assembled battery 1B. In addition, as shown in FIG. 10B, the total negative busbar 30B to which only the negative electrode terminal 14 is connected is provided on a second surface of the assembled battery 1B. Even when adopting such a structure, by providing each busbar 30 with a joining projection and a locking biasing portion, using the locking biasing portion to cause the electrode terminals 12 and 14 to engage with the busbar 30, and biasing the electrode terminals 12 and 14 toward the joining projection, welding between the busbar 30 and the electrode terminals 12 and 14 can be performed in an appropriate manner.

(3) Means of Welding Busbar and Electrode Terminals to Each Other

In addition, while the busbar and the electrode terminals are welded to each other using a laser beam in the embodiment described above, means of welding the busbar and the electrode terminals to each other is not limited to laser welding.

For example, being unable to check welding positions of a busbar and an electrode terminal as in prior art when welding the busbar and the electrode terminal to each other using ultrasonic waves creates a risk of causing the welding positions of the busbar and the electrode terminal to shift and preventing ultrasonic welding from being appropriately performed. In contrast, in the assembled battery disclosed herein, ultrasonic welding can be appropriately performed while checking welding positions of the busbar and the electrode terminal.

In addition, in the assembled battery disclosed herein, a gap can be prevented from being created between the busbar and the electrode terminal by fixing the busbar and the electrode terminal to each other and biasing the electrode terminal toward the joining projection using the locking biasing portion. Therefore, ultrasonic welding can be performed in a state where welded objects are in contact with each other in an appropriate manner and an occurrence of a poor weld can be preferably prevented.

Even when welding means other than laser welding and ultrasonic welding is used, similarly, since welding can be appropriately performed while checking welding positions and, at the same time, the electrode terminal and the busbar can be brought into surface contact with each other in an appropriate manner, occurrences of various problems such as a poor weld can be preferably prevented.

While specific examples of the present disclosure have been described in detail, such specific examples are merely illustrative and are not intended to limit the scope of claims. Techniques described in the scope of claims include various modifications and changes made to the specific examples illustrated above.

What is claimed is:

1. A manufacturing method of an assembled battery in which a plurality of single cells are arranged along a prescribed arrangement direction and each of adjacent single cells is electrically connected by a busbar, the single cell including an electrode body, an outer package which houses the electrode body, and an electrode terminal which is a plate-shaped conductive member having a first end connected to the electrode body inside the outer package and a second end protruding to the outside of the outer package, the busbar including a plate-shaped base portion which is disposed between the electrode terminals of adjacent single cells and which extends along the arrangement direction, a plate-shaped joining projection, which projects from the plate-shaped base portion in a direction along a height direction of the single cell and a pair of locking biasing portions spaced apart from each other and projecting from the base portion, wherein the pair of locking biasing portions locks the electrode terminal and the busbar to each other and biases the electrode terminal toward the joining projection, each locking biasing portion, of the pair of locking biasing portions, including (i) a rising portion which extends along the electrode terminal from an end of the base portion and (ii) an arm portion which extends over a tip portion of the electrode terminal in a curved shape from a tip portion of the rising portion so as to face the rising portion with the electrode terminal sandwiched therebetween, wherein the manufacturing method of an assembled battery comprises the steps of:

bringing the plate-shaped electrode terminal and the plate-shaped joining projection into surface contact with each other, causing the locking biasing portion to lock the electrode terminal of the single cell, biasing the electrode terminal toward the joining projection using the locking biasing portion, and forming an exposed area which exposes the tip portion of the electrode terminal and a tip portion of the joining projection, between the arm portions of the pair of locking biasing portions; and welding the tip portion of the electrode terminal and the tip portion of the joining projection to each other in the exposed area.

2. The manufacturing method of an assembled battery according to claim 1, wherein the tip portion of the electrode terminal and the tip portion of the joining projection are welded to each other by a laser beam.

* * * * *